US008719221B2

(12) United States Patent
Rawal et al.

(10) Patent No.: US 8,719,221 B2
(45) Date of Patent: May 6, 2014

(54) METHOD AND APPARATUS FOR PLANNING EVENT USING CALENDAR APPLICATION IN MOBILE TERMINAL

(75) Inventors: Harit Rawal, Bangalore (IN); Muhammad Saheer Cheruvath, Bangalore (IN)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 254 days.

(21) Appl. No.: 13/013,955

(22) Filed: Jan. 26, 2011

(65) Prior Publication Data
US 2011/0184974 A1 Jul. 28, 2011

(30) Foreign Application Priority Data

Jan. 28, 2010 (IN) .............................. 210/CHE/2010
Jan. 5, 2011 (KR) ........................ 10-2011-0001153

(51) Int. Cl.
G06F 17/30 (2006.01)
(52) U.S. Cl.
USPC .......................................... 707/621; 707/951
(58) Field of Classification Search
None
See application file for complete search history.

(56) References Cited

U.S. PATENT DOCUMENTS

| 7,334,000 B2 * | 2/2008 | Chhatrapati et al. ................... 1/1 |
| 8,219,430 B1 * | 7/2012 | Thompson et al. ........... 705/7.12 |
| 2003/0149605 A1 * | 8/2003 | Cragun et al. ..................... 705/8 |
| 2004/0093290 A1 * | 5/2004 | Doss et al. ....................... 705/35 |
| 2005/0288987 A1 * | 12/2005 | Sattler et al. ........................ 705/9 |
| 2007/0185744 A1 * | 8/2007 | Robertson .......................... 705/5 |
| 2007/0208604 A1 * | 9/2007 | Purohit et al. ..................... 705/9 |
| 2007/0282840 A1 * | 12/2007 | Stienhans .......................... 707/9 |
| 2008/0015922 A1 * | 1/2008 | Nelken ............................. 705/8 |
| 2008/0046298 A1 * | 2/2008 | Ben-Yehuda et al. ............. 705/6 |
| 2008/0127231 A1 * | 5/2008 | Shaffer et al. .................. 719/328 |
| 2008/0281665 A1 * | 11/2008 | Opaluch ............................ 705/9 |
| 2008/0300944 A1 * | 12/2008 | Surazski et al. ................... 705/8 |
| 2009/0222291 A1 * | 9/2009 | Montavon et al. ................. 705/7 |
| 2011/0072372 A1 * | 3/2011 | Fritzley et al. ................. 715/764 |

OTHER PUBLICATIONS

Conner, Nancy, "Google Apps: The Missing Manual," May 2008, O'Reilly Media / Pogue Press, Chapter 7, pp. 349-407.*
European Patent Office (EPO); Statement in accordance with the Notice from the EPO dated Oct. 1, 2007 Concerning Business Methods; Official Journal of the European Patent Office, vol. 30, No. 11; Nov. 1, 2007; XP007905525.

* cited by examiner

Primary Examiner — Richard Bowen
(74) Attorney, Agent, or Firm — Cha & Reiter, LLC

(57) ABSTRACT

A method and apparatus for planning an event using calendar application in an electronic device preferably includes entering information associated with duration of event. A calendar application scans the calendar to identify one or more set of continuous holidays corresponding to the duration of event. A number of additional days available leave is also identified with each of the one or more set of continuous holidays to fulfill the duration of the event in addition to the continuous holidays. Further, a list can be created of one or more proposed range of dates corresponding to the duration of event, the one or more set of continuous holidays and the number of additional days leave. One or more proposed range of dates and the number of additional days associated with each of the one or more proposed range of dates from the list can be is displayed.

18 Claims, 15 Drawing Sheets

NOTE THAT HERE 14TH MARCH TO 22ND MARCH IS THE CONSIDERED HOLIDAY SET BY THE USER FOR PLANNING HIS HOLIDAYS

METHOD AND APPARATUS FOR PLANNING EVENT USING CALENDAR APPLICATION IN MOBILE TERMINAL

CLAIM OF PRIORITY

This application claims priority under 35 U.S.C. §119(a) from an Indian provisional patent application entitled "Method And Apparatus For Planning Event Using Calendar Application In Mobile Terminal" filed in the Indian Patent Office on Jan. 28, 2010, assigned Serial No. 210/CHE/2010, and from a Korean Patent Application filed in the Korean Intellectual Property Office on Jan. 5, 2011, assigned Serial No. 10-2011-0001153, the contents of each of which are incorporated herein by reference in their entirety.

BACKGROUND OF THE INVENTION

1. Field of the Invention

The present invention relates to managing data in electronic devices. More particularly, the present invention relates to methods for planning events using calendar application in electronic devices.

2. Description of the Related Art

Electronic devices, such as, for example, mobile phones, Personal Digital Assists (PDA's), computers, and smart phones are becoming more sophisticated and technologically advanced with each passing day. Nowadays, the electronic devices are enabled typically with a plurality of applications. For example, mobile phones along with enabling wireless communication also provide various other applications. The various other features in the mobile phone includes, but are not limited to, FM radio, Music player, Multimedia player, Audio/Video player, Camera, Short range wireless communication, calendar application. Hence, the use of mobile phones has increased significantly in day-to-day life because of the presence of the plurality of new applications, sometimes referred to as "apps".

Today, the mobile phones are also enabled with enhanced applications. For example, the mobile phones enable users to edit and modify audio/video data and multimedia data present in the mobile phones using audio/video applications. The user can also view the upcoming holidays in the calendar applications of the mobile phone. Further, the user can also associate a task and create a reminder in the calendar application for that task.

Further, exchange and storing of different data associated with the calendar application is also possible. For example, the user can send a to-do list associated with a specific date to one or more people. The user can send an alarm, subsequent reminders and also associate an event with a specific date in the calendar application. Hence, the calendar applications of the mobile phones are now part of daily life of mobile users. The calendar applications enable the user to plan their daily activities without keeping physical logbooks or calendars on the walls, cubicles, etc. Most of the current mobiles available in market come with features like alarm, appointments, scheduler, holidays, tasks and the like.

However, with the current features available in the calendar application if a user has to plan an event, for example, for a vacation or holidays, then the user has to scan the calendar again and again in order to find a continuous (i.e. consecutive) set of holidays. This may further lead to missing of important continuous holidays and will also be time consuming for the user. For planning the event using the current available calendar application, the user has to remember all continuous holidays in all the month in-order to plan the event.

Furthermore, to account for the holidays of friends while planning the event the task becomes more onerous as holidays of different people might differ from each other. Also, while planning the event the user can sometime miss important days like anniversary, birthdays, business meetings and the like.

Hence there exists a need in the art for a method and system that efficiently and effectively plans an event using a calendar application of an electronic device such as a portable communication terminal.

SUMMARY OF THE INVENTION

Accordingly, an aspect of the present invention is to provide a method and apparatus for planning an event by using a calendar application in a mobile terminal.

In an exemplary embodiment, a method for planning an event using calendar application in an electronic device preferably includes entering information associated with duration of the event. The information associated with the duration of the event is at least one of a range of predefined dates including a start date and an end date, a number of days associated with the event, a predefined number of days that is taken as "leave" of "holiday-leave" or "personal holidays" as the case may be, one or more months during which the event is scheduled, and one or more years during which the event is scheduled. After entering the information, the calendar application is then scanned to identify one or more set of continuous holidays corresponding to the duration of the events. The continuous holidays are identified based on a list of predefined holidays that is associated with the calendar application and a list of restricted holidays. The list of restricted holidays is at least one of Saturday, Sunday, optional holidays and ad-hoc holidays. In addition there is identified a number of additional days leaves associated with each of the one or more set of continuous holidays to fulfill the duration of the event in addition to the continuous holidays. Thereafter a list is created of one or more proposed range of dates that corresponds to the duration of the event, the one or more set of continuous holidays and the number of additional days leaves. Furthermore, the list of one or more proposed range of dates and the number of additional days associated with each of the one or more proposed range of dates is displayed, during which the event can be planned.

In another exemplary embodiment, an apparatus for planning an event using calendar application in an electronic device is provided. The apparatus includes an input unit, a processor and a display unit. The input unit enables a user to input information associated with duration of an event. The processor scans a calendar application in the electronic device to identify one or more set of continuous holidays corresponding to the duration of the events. The processor further enables the electronic device to identify a number of additional days leaves associated with each of the one or more set of continuous holidays that is required to fulfill the duration of events in addition to the continuous holidays. The processor also creates a list of one or more proposed range of dates that corresponds to the duration of the event, the one or more set of continuous holidays and the number of additional days leaves. The display unit displays a list of one or more proposed range of dates and the number of additional days associated with each of the one or more proposed range of dates, during which the event can be planned.

The features and advantages of the present invention will become more apparent from the ensuing detailed description of the invention taken in conjunction with the accompanying drawings.

Before advancing to the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other features and advantages of one or more exemplary embodiment(s) of the present invention will become more apparent from the following detailed description taken in conjunction with the accompanying drawings, in which.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

DETAILED DESCRIPTION

FIGS. 1 through 13, discussed below, and the various exemplary embodiments used to describe the principles of the present disclosure in this patent document are by way of illustration only and should not be construed in any way to limit the scope of the appended claims. Those skilled in the art will understand that the principles of the present disclosure may be implemented in any suitably arranged communications system. The terms used to describe various exemplary embodiments are exemplary. It should be understood that these are provided to merely aid the understanding of the description, and that their use and definitions in no way limits the scope of the claimed invention. Terms such as first, second, and the like are used to differentiate between objects having the same terminology and are no where intended to represent a chronological order, as and where stated otherwise. A set is defined as a non-empty set including at least one element.

Figure 1:
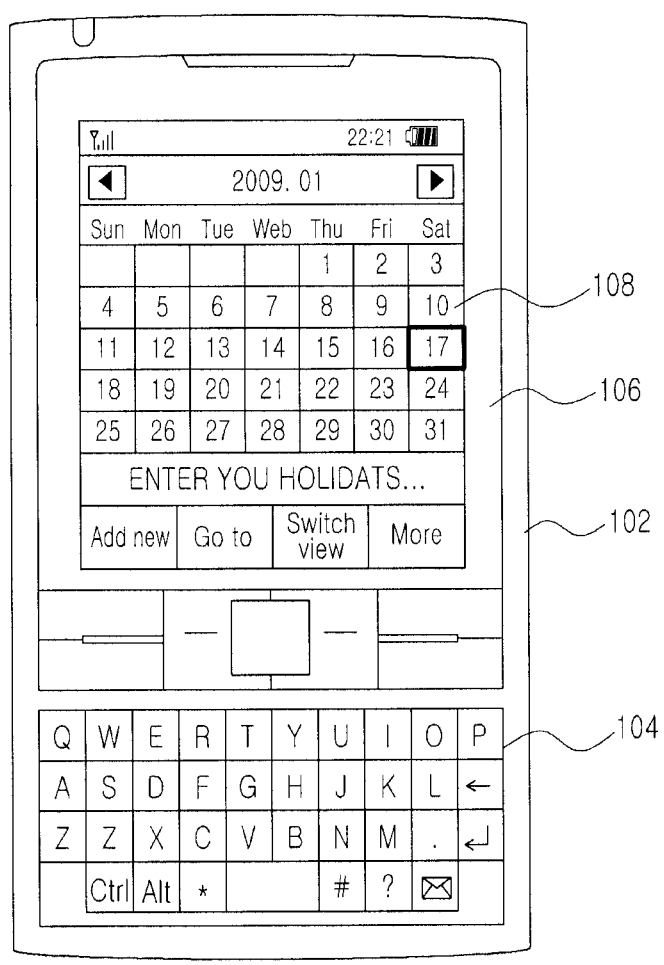
FIG. 1 illustrates an exemplary environment, where various exemplary embodiments of the present invention can be practiced.

FIG. 1 illustrates an exemplary environment 100, in which various embodiments of the present invention can be practiced. The environment 100 includes an electronic device 102. Examples of the electronic device 102 include, but are not limited to, Mobile phones, Laptops, Personal Digital Assistants (PDA), tablet computers, portable communication terminals. For the purpose of this description and for the sake of clarity, the terms such as electronic device and mobile phone are used interchangeably hence it does not in any way the scope of the claimed invention to a mobile phone.

The electronic device 102, for example a mobile phone 102, is capable of performing various features. For example, the mobile phone 102 is used for communication, sending messages, capturing images, accessing audio/video files, accessing calendar application, notification of an event, planning of an event, and the like. The mobile phone 102 is shown to include an input device 104 and a display unit 106. It is within the spirit and scope of the claimed invention that the display may comprise a touch display which doubles as or supplements the input device. The mobile phone 102 is also shown to include a calendar application 108. In the environment 100, a user of the mobile phone 102 can access the calendar application 108 to view dates. Further, using the calendar application 108 the user can view items such as festivals, holidays associated with the date, tasks, meetings, appointments and the like.

A holiday planner application is associated with the calendar application to effectively manage holidays. Hence, for the purpose of this description the terms holiday planner application and the calendar application can be used interchangeably. Hence, the holiday planner application 108 is used to view continuous holidays during a particular period. Hence, the calendar application 108 enables the user to plan an event based on continuous holidays. The user can access the holiday planner application 108, if the user wishes to plan his/her holidays by seeing all the continuous set of holidays (weekends and predefined holidays) over a particular period of days, for example a predefined month or a predefined year.

In an exemplary embodiment, the holiday planner application 108 also allows the user to check for all the continuous holidays which he/she may get after taking extra leaves (like Casual Leaves (CL's) and Privileged Leaves (PL's)) from his workplace combined with already present holidays in the calendar application. In the exemplary embodiment, the application will scan through the calendar over the year and perform a lot of search combinations to identify continuous holidays along with extra leaves (like CL's and PL's) from the user's workplace, weekend holidays and predefined holidays. This enables the user to utilize his/her holidays to the fullest.

In an exemplary embodiment, the holiday planner application 108 also enables the user to take into account other people (like friends and relatives) leaves while planning for an event. In the embodiment, user receives or request for their holidays list and can sync with his/her holidays. Further, the application can identify common holidays from the entire holiday lists received and the holidays stored in the calendar application and can thereafter notify the user of the common holidays for planning the event.

In addition, while planning an event, the holiday planner application 108 will notify the user if a predefined event, for example birthdays, anniversaries and the like, is already associated with the proposed dates.

Figure 2:
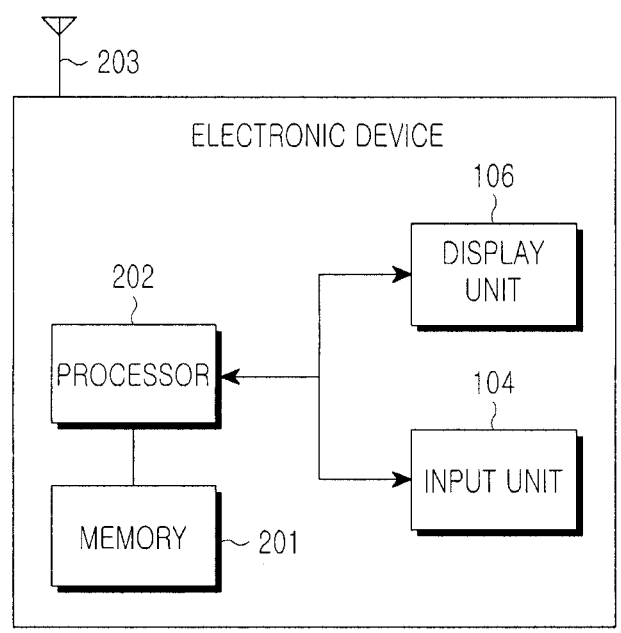
FIG. 2 illustrates an electronic device, in accordance with one exemplary embodiment of the present invention.

FIG. 2 illustrates an electronic device (102), in accordance with an exemplary embodiment of the present invention. To explain the electronic device 102, references will be made to FIG. 1. However, it will be apparent to a person ordinarily skilled in the art that the present exemplary embodiment can be explained with the help of any other suitable exemplary embodiment of the present invention. The electronic device includes an input unit 104, a processor 202, memory, antenna means 203, and a display unit 106. The input unit 104 enables a user to input information associated with duration of an event. The antenna means 203 permits wireless communication that may include visible light communication (VLC). Memory 201 is in communication with processor 202 and may include modules such as a calendar application module, etc.

The processor 202 scans a calendar application in the electronic device, for example, the holiday planner application 108, to identify one or more sets of continuous holidays corresponding to the duration of the events. Processor 202 further enables the electronic device 102 to identify a number of additional days leaves associated with each of the one or more sets of continuous holidays. The number of additional days is the leaves that are required to fulfill the duration of events in addition to the continuous holidays.

The processor 202 also creates a list of one or more proposed range of dates that corresponds to the duration of the event, the one or more set of continuous holidays and the number of additional days leaves. The display unit 106 displays a list of one or more proposed range of dates and the number of additional days associated with each of the one or more proposed range of dates, during which the event can be planned.

Figure 3:
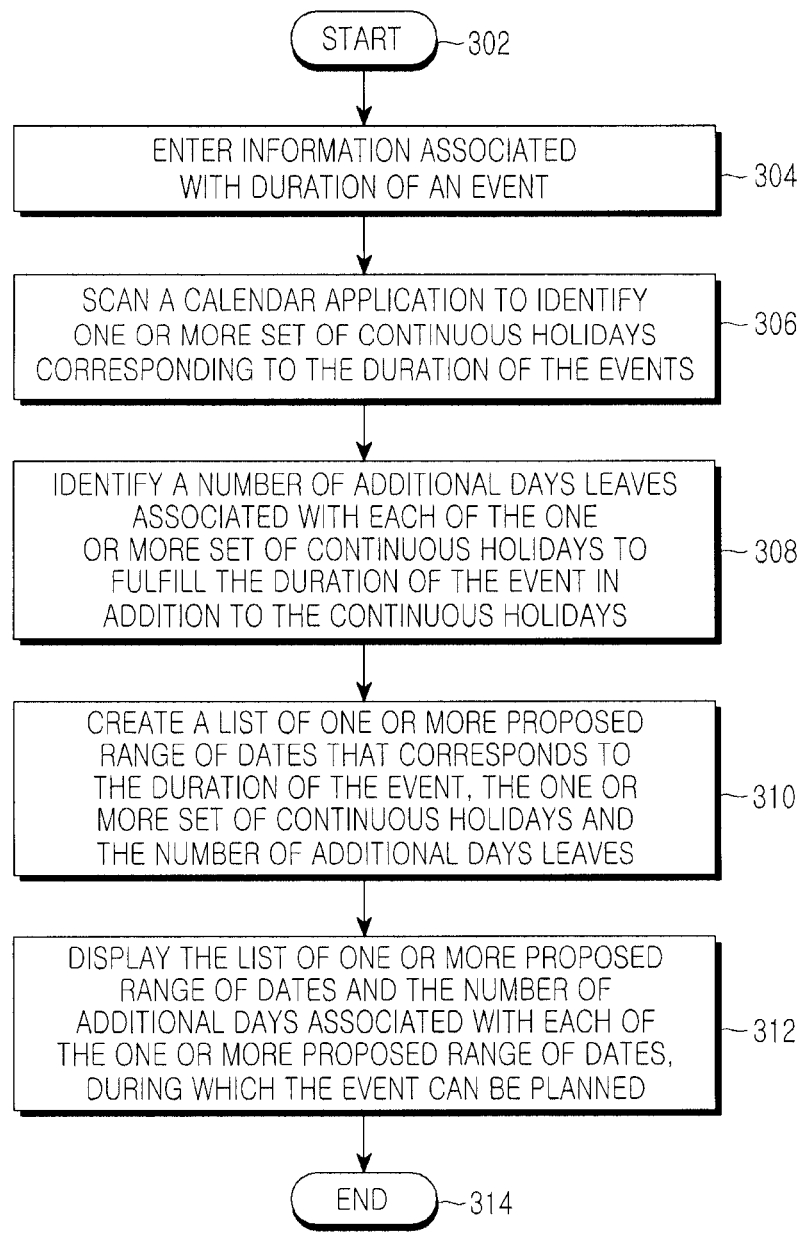
FIG. 3 illustrates a flow chart depicting a method for planning an event using calendar application in the electronic device, in accordance with one exemplary embodiment of the present invention.

FIG. 3 illustrates a flow chart depicting exemplary steps of a method for planning an event using calendar application in the electronic device, in accordance with an exemplary embodiment of the present invention. To explain the method 300, references will be made to FIG. 1. However, it will be apparent to a person ordinarily skilled in the art that the present exemplary embodiment can be explained with the help of any other suitable exemplary embodiment of the present invention. The method 300 can also include a greater or fewer number of steps as depicted in FIG. 3. Further, the order of the steps may also vary.

With reference to FIG. 3, at step 302, the method 300 is initiated. At step 304, a user enters information associated with duration of an event. In an exemplary embodiment, the information associated with the duration of the event is a range of predefined dates including a start date and an end date. For example, the range of days entered are from Dec. 23, 2009 to Dec. 30, 2009. In another exemplary embodiment, the information associated with the duration of the event is a number of days associated with the event. For example, the user can enter six ('6'), if six days are required to plan the event.

In another exemplary embodiment, the information associated with the duration of the event is a predefined number of days that is taken as leaves. For example, the user can enter a number of additional days he/she can afford to take leave in addition to the holidays that he/she is getting from an organization and the number of weekend days that may be taken as leave. In another exemplary embodiment, the information associated with the duration of the event is one or more month during which the event is scheduled. For example, the user can also enter a month during which he wants to find continuous holidays. For example the user can enter the month 'December'.

In another exemplary embodiment, the information associated with the duration of the event is one or more years during which the event is scheduled. For example the user can enter a year '2010' to identify all the continuous holidays in that year.

At step 306, the calendar is scanned to identify one or more sets of continuous holidays corresponding to the duration of the events. In an exemplary embodiment, the continuous holidays are identified based on a list of predefined holidays that is associated with the calendar application and a list of restricted holidays. The list of restricted holidays is Saturday, Sunday, optional holidays and/or ad-hoc holidays.

In an exemplary embodiment, the list of predefined holidays in the calendar application is associated with at least one of national holidays, restricted holidays, holidays associated with an organization, lists of holidays received from one or more electronic devices. For example, the 25th of December is marked as a holiday on account of 'Christmas' and the 28th of December is marked as a holiday on account of 'Moharram' in the calendar application of Year 2009.

Further, the method 300 will scan the calendar and identify the dates from December 25 to December 28 (25, 26, 27, and 28), if the user enters 'December' month to plan the event during continuous holidays. In the identified dates 26th December and 27th December are weekend holidays. In an exemplary embodiment, the calendar application is scanned to identify one or more set of continuous holidays that includes maximum number of continuous holidays corresponding to the duration of the event. For example, if in the month of December there are four continuous holidays during December 25th to December 28th and five continuous holidays from December 10th to December 14th then the method identifies the range of dates that has maximum number of continuous holidays, which, in this example is five, (from December 10th to December 14th).

At step 308, the method 300 identifies a number of additional days of leave associated with each of the one or more sets of continuous holidays to fulfill the duration of the event in addition to the continuous holidays. For example, if the user wants six days leaves in December then the method scans the dates of the December month and identifies the continuous holidays and the additional days of leave that the user might have to take. For example, the method 300 identifies the dates from December 25 to December 28 and will notify two additional days that needs to be taken to complete six days of leave as entered by the user.

At step 310, the method creates a list of one or more proposed range(s) of dates that correspond(s) to the duration of the event, the one or more set of continuous holidays and the number of additional days leave. For example if the dates 10th December and 11th December are also marked as holidays and December 12th and 13th being weekend holidays in the calendar application, then the method will also identify these dates along with the dates from December 25th to 28th to satisfy the duration of the event which is six days.

Hence, the method according to the presently claimed preferably will identify and create a list of two probable dates and will notify the user. For example, if the user wants six days of leave in December then the dates of the December month are scanned and two ranges of dates are identified: a first range being December 10th to December 13th with two additional days of leave and a second range being December 25th to December 28th with two additional days leave.

In an exemplary embodiment, the a range of dates is identified that includes a least number of days from the number of additional days associated with each of the one or more proposed range(s) of dates. For example, the method identifies the range of dates for which the user needs to take minimum number of additional days leave. Thereafter, the method notifies the range of dates that includes the least number of additional days.

At step 312, the list of one or more proposed range of dates is displayed along with the number of additional days associated with each of the one or more proposed ranges of dates, during which the event can be planned. Hence an event date is selected from the list of one or more proposed ranges of dates and the number of additional days associated with each of the one or more proposed range of dates. In an embodiment, the user can schedule the event on one of the proposed range of dates and mark the range of dates as event dates.

In an exemplary embodiment, the list of one or more proposed ranges of dates and the number of additional days associated with each of the one or more proposed range of dates can be shared with one or more users associated with one or more electronic devices.

In yet another exemplary embodiment, a list of holidays can be received from one or more electronic devices. Thereafter, the method synchronizes the list of predefined holidays in the calendar application with the list of holidays received from the one or more electronic devices.

According, the present invention can then identify common holidays that includes list of holidays that are common in the list of predefined holidays, the list of received holidays, and the restricted holidays. A list of one or more common ranges of dates and the number of additional days associated with each of the one or more common range of dates based on the common holidays is then displayed on the display unit 106.

In an exemplary embodiment, there is sharing of a list of one or more common range of dates and the number of additional days associated with each of the one or more common range of dates with the one or more electronic devices based on the common holidays. In another exemplary embodiment, the activities associated with the event can also be suggested along with sharing the list of one or more common range of dates and the number of additional days associated with each of the one or more common range of dates. For example, the user can share "Trip to Malaysia from December 25th to December 28th with friends.

In addition, a predefined task is identified if the predefined task date corresponds with the list of one or more proposed range(s) of dates and the number of additional days associated with each of the one or more proposed range of dates. Moreover, the predefined task is a task that is set in the calendar application prior to planning of the event. For example, if a user has already associated a date, say December 26th, as an anniversary date, then while selecting the range of dates from December 25th to December 28th for the event, the notification of the anniversary will be shown on the display unit 106 while associating the event with the dates. In another example, the notification will mention that the anniversary falls between the proposed ranges of dates. Hence the user can decide if he/she wants to associate the event with the dates or not.

In another exemplary embodiment, an alert is displayed in the electronic device that associated with the event dates before a predefined number of days. For example, an alert is displayed on the display unit 106 of the electronic device 102 one (1) day before an event is scheduled. An alert can be displayed when an additional reminder is set in the event dates. For example, if the event is scheduled from December 25th to December 28th, and then a user tries to add an additional reminder on those dates, then the method will pop up an alert message stating the overlapping of the events on the particular date. In an exemplary embodiment, the event dates are also grouped and an event name corresponding to the event dates is also displayed on the display unit, for example the display unit 106. The event dates can also be highlighted with different colors based on preference. This highlighting will enable the user to identify the event dates while viewing and scanning the calendar application. At step 314, the operation is terminated.

Figure 4:
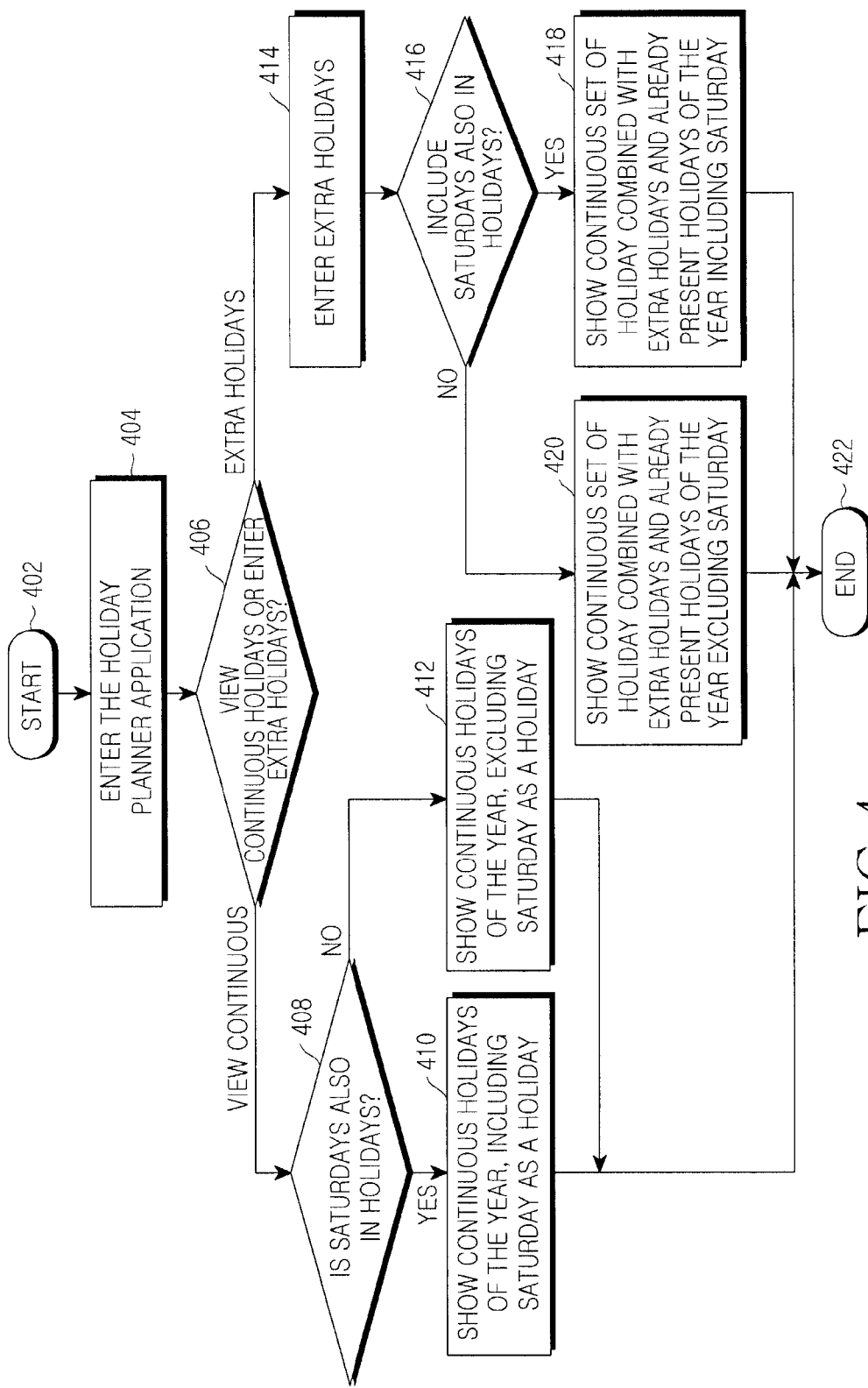
FIG. 4 illustrates a flow chart depicting a method for planning an event using calendar application in the electronic device, in accordance with another exemplary embodiment of the present invention.

FIG. 4 illustrates a flow chart depicting exemplary operation of a method for planning an event using calendar application in the electronic device, in accordance with another embodiment of the present invention. The flow chart describes steps involved for viewing continuous holidays in the calendar application. For example, at step 402, the method is initiated.

At step 404, a user of the electronic device enters a holiday planner application associated with the calendar application in the electronic device 102.

In an exemplary embodiment, the setting of holidays in the calendar application is present in the calendar options and the user is expected to have entered all his/her workplace holidays or other holidays in the holiday planner application. In the holiday planner application user will have different options. For example, the user will have an option of viewing continuous holidays.

At step 406, the user gets an option of viewing a continuous holidays or an option of entering extra holidays that the user wishes to take. In an exemplary embodiment, a "view holidays" option will search for all continuous holiday set in the calendar application.

For example, weekend holidays like Saturday and Sunday and a predefined holidays in the calendar and will display a full set of continuous holidays (with Saturday, Sunday and predefined holidays) over the year.

If at step 408, the user selects the 'view continuous' holidays option, than the user is prompted to enter information about the weekend holidays. For example, the method prompts and request if the wants to include Saturday also as weekend holidays.

At step 410, the device displays continuous holidays of the year, including Saturday as a holiday, if the user selects Saturday also as being a holiday.

At step 412 the display shows continuous holidays of the year, excluding Saturday as a holiday if the user does not select Saturday as part of weekend holidays.

At step 406, if the user chooses an option to enter extra holidays then, at step 414 the will receive a request to input the number of extra holidays he/she may wish to opt. In an exemplary embodiment, the "Extra holidays" will give an option to the user to see all possible continuous set (including these extra holidays and the already present holidays over the year) of holidays over year. These extra holidays can be any types of holidays like Casual Leaves, Paid Leaves, and the like.

Thus, the method according to the present invention will intelligently search for all possible combinations with already-present holidays, Saturdays (will be considered only if the user enters Saturday as holidays), Sundays and the extra holidays entered by the user and will display to the user the full list of all the possible available holidays over the year.

At step 416, the user is prompted to enter whether he/she wants to enter Saturday also as holidays. At step 418, if the user selects Saturday as a holiday then a continuous set of holidays combined with extra holidays and already present holidays of the year including Saturday is shown on the display unit 106 of the electronic device 102. At step 420, a continuous set of holidays combined with extra holidays and already-present holidays of the year excluding Saturday is shown if the user does not select Saturday as holiday. At step 422 the method is terminated.

Figure 5:
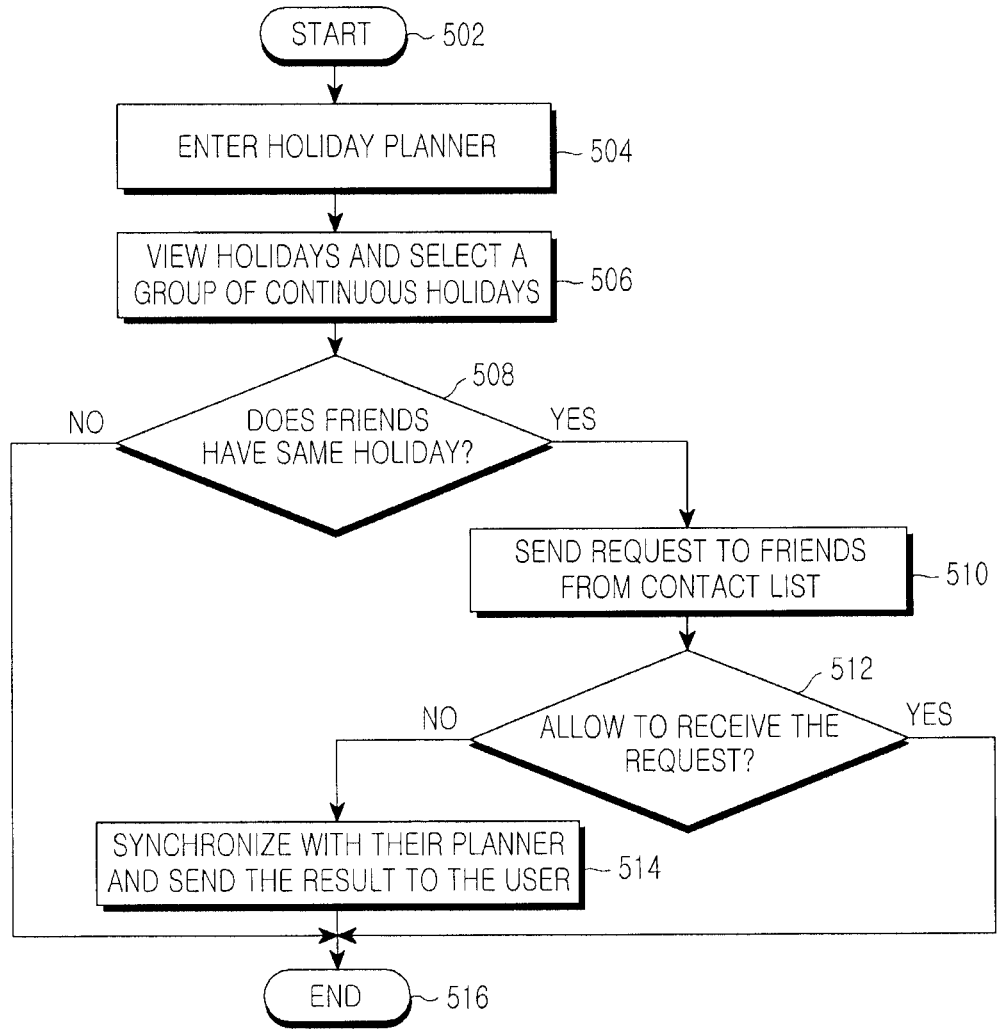
FIG. 5 illustrates a flow chart depicting a method for planning an event using calendar application in the electronic device, in accordance with yet another exemplary embodiment of the present invention.

FIG. 5 illustrates a flow chart depicting exemplary operation of a method for planning an event using calendar application in the electronic device, in accordance with yet another exemplary embodiment of the present invention. The flow chart describes steps involved in searching for friends having the same continuous holidays. At step 502 the method is initiated.

At step 504, a user enters holiday planner application. At step 506, the user tries to view continuous holidays using the holiday planner application and selects a group of continuous holidays. At step 508 the user is interested in finding friends with same set of holidays. Hence, the user selects an option of searching for one or more friend contacts from the contact list. The user can then select friends contacts with whom the user wants to plan his/her holidays. In an exemplary embodiment, the method will prompt the user for confirmation for sending the request to the selected friends contact information. In an exemplary embodiment, the user can send the group of continuous holidays using any short range wireless communication network.

At step 510, a request will be sent to all the selected contacts once the user confirms for sending the request to the select contacts (i.e. friends).

At step 512, each of the selected contacts will be asked for a confirmation to receive the holiday list request before any operation is performed. The method terminates if a selected contact user does not allow for receipt of the holiday list request. Further, if the selected contact user opts to receive the request, then the holiday planner application will start searching in the selected contact's holiday planner for same set of holidays as selected by the user on the terminals of the contacts who will confirm the user's request. After the searching operation is performed, the user will be notified of the results.

Further, the user can choose to sync with notified contacts for that holiday set. Once user confirms the sync option, the sync will be performed and user will remain in sync with his selected friends for that schedule (holiday set). At step 514, the method will synchronize the holidays of the user and the friend and thereafter notify the common days to the user. At step 516, the method is terminated.

Figure 6:
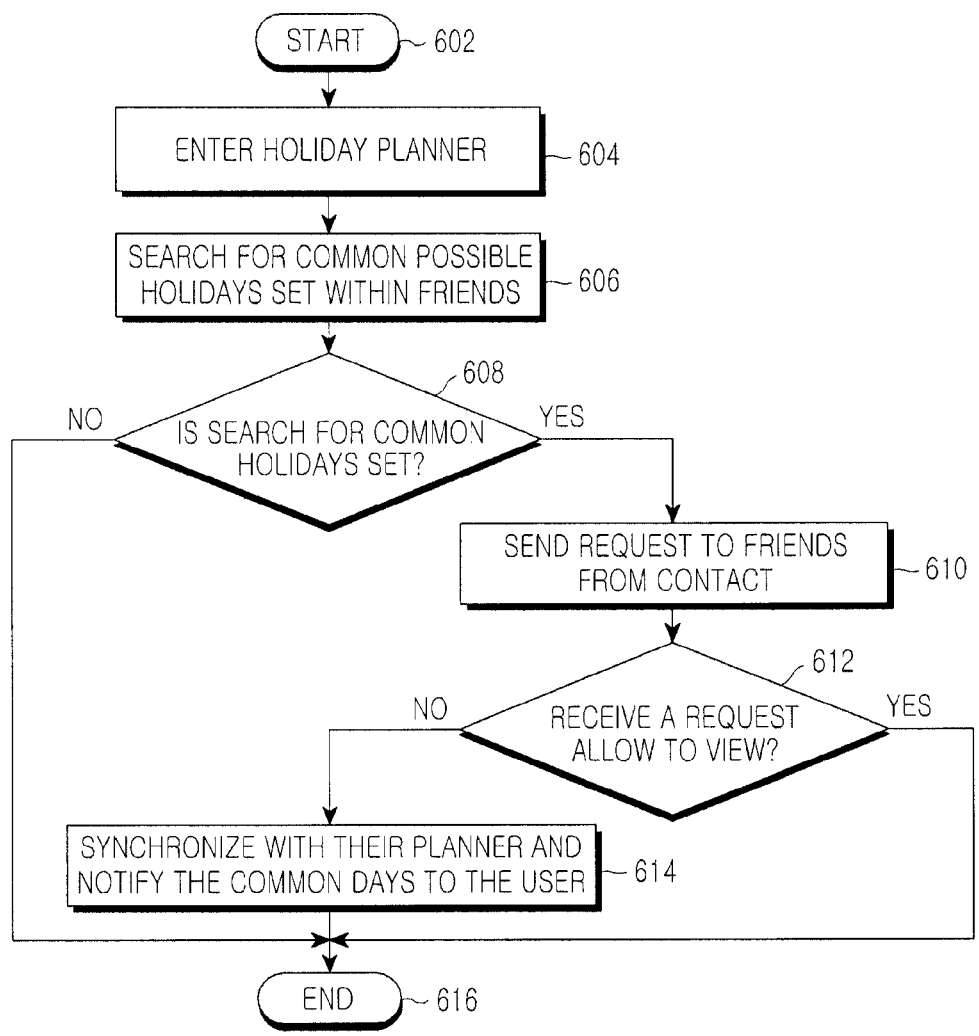
FIG. 6 illustrates a flow chart depicting a method for planning an event using calendar application in the electronic device, in accordance with still another embodiment of the present invention.

FIG. 6 illustrates a flow chart depicting exemplary operation of a method for planning an event using calendar application in the electronic device, in accordance with still another exemplary embodiment of the present invention. In this example, the flow chart describes steps involved in searching for common continuous holidays within friends.

At step 602 the method is initiated. At step 604 a user enters a holiday planner application. The user can select a set of continuous holidays and can thereafter find a best possible set of holidays among friends.

At step 606, the device searches for common possible holidays set within friends. In one example, the user, after selecting the search for common holiday option, will be directed to the phone book where the user can select the friends among whom he/she wants to find the holidays. At step 608, the method will check if the search for common holiday option is set in the holiday planner application. If the search for common holiday option is not set, than the method terminates at step 616. If the search for common holiday option is set in the holiday planner application, then the user will be prompted for confirmation for sending the request to selected contacts.

At step 610, a holiday plan request will be sent to all the selected contacts. At step 612, each of the selected contact will be asked for a confirmation to receive the holiday plan request before any operation is performed. Thereafter, the holiday planner application will start searching in selected contact's holiday planner application for the best possible set of holidays among the selected contacts. Once the searching operation is performed, the user will be notified of the results.

At step 614, the user can choose to sync the holidays with notified contacts. Furthermore, when the user confirms the sync option, the sync will be performed and user will remain in sync with his selected friends for that schedule (holiday set). Thus user can easily know about common holidays within the selected contacts and can plan his holiday more effectively and can get updates regarding changes in the plans if any of the selected contacts that is synced changes the plan. At step 616, the method is terminated.

Figure 7A:
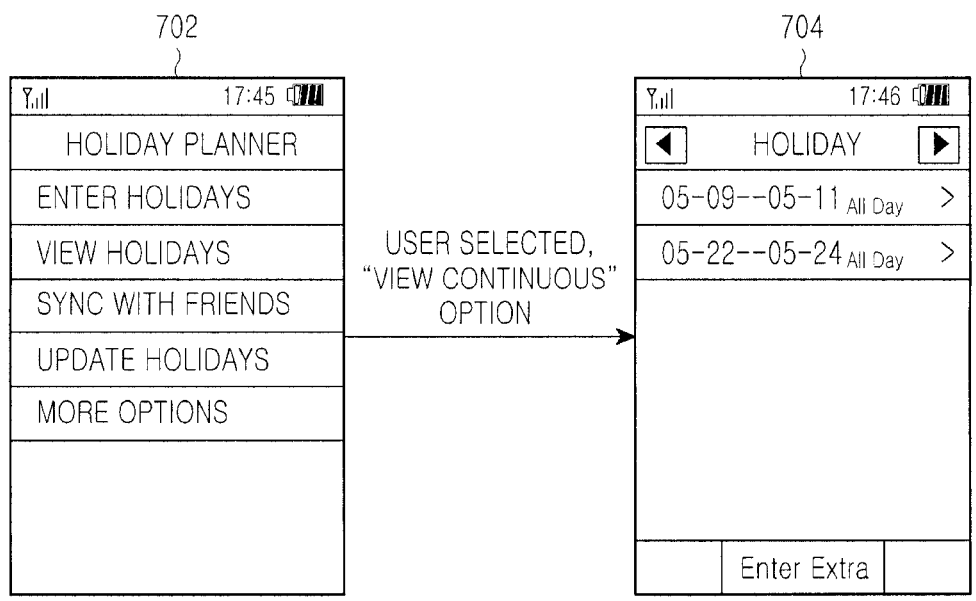
FIG. 7A and FIG. 7B illustrate an exemplary user interface for planning an event using calendar application in the electronic device, in accordance with an exemplary embodiment of the present invention.
Figure 7B:
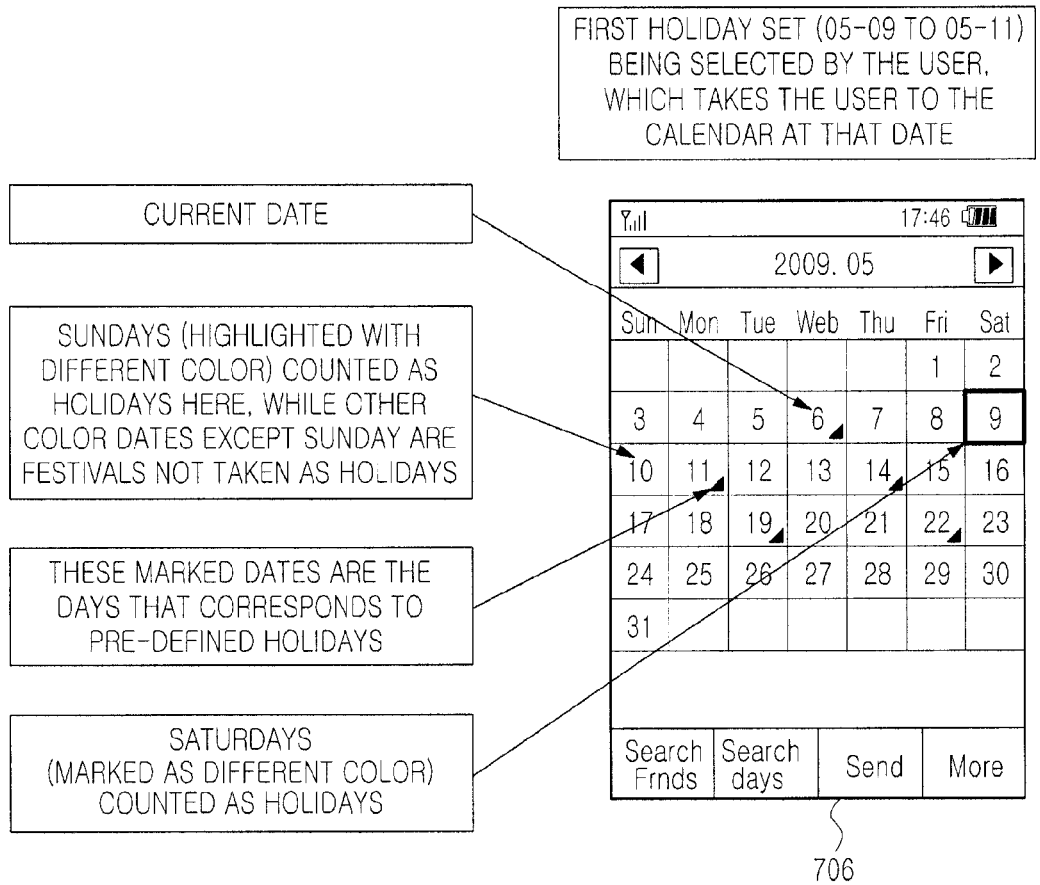

FIG. 7A and FIG. 7B illustrate exemplary operation of an user interface for planning an event using calendar application in the electronic device, in accordance with at least one of the exemplary embodiments of the present invention. For example, the user interface shows user in holiday planner application, displaying a continuous holidays set (in this case less than or equal to 3 day holidays) over the year from holidays entered by user. In this example, the user has selected Saturday and Sunday as the holidays.

With particular reference to FIG. 7A, the interface mainly gives a visual demo of displaying continuous holidays set (# a 3-day holiday) over the year from the holidays associated with the calendar application. Initially the user enters the holiday planner application as shown in section 702.

Thereafter, the user selects an option to view continuous holidays over the year from the current date, so the user selects "view holiday option". As shown in section 704 all the continuous holiday that have been set (<=3) over the year will be shown to the user (here Saturday and Sunday are assumed as holidays of the user).

The user can select a range of dates from the holiday list set and go to the respective holiday set. With reference to FIG. 7B, as shown in section 706, the range of dates selected for holiday can be highlighted in any color to inform the user about the holiday list selected by the user.

Figure 8A:
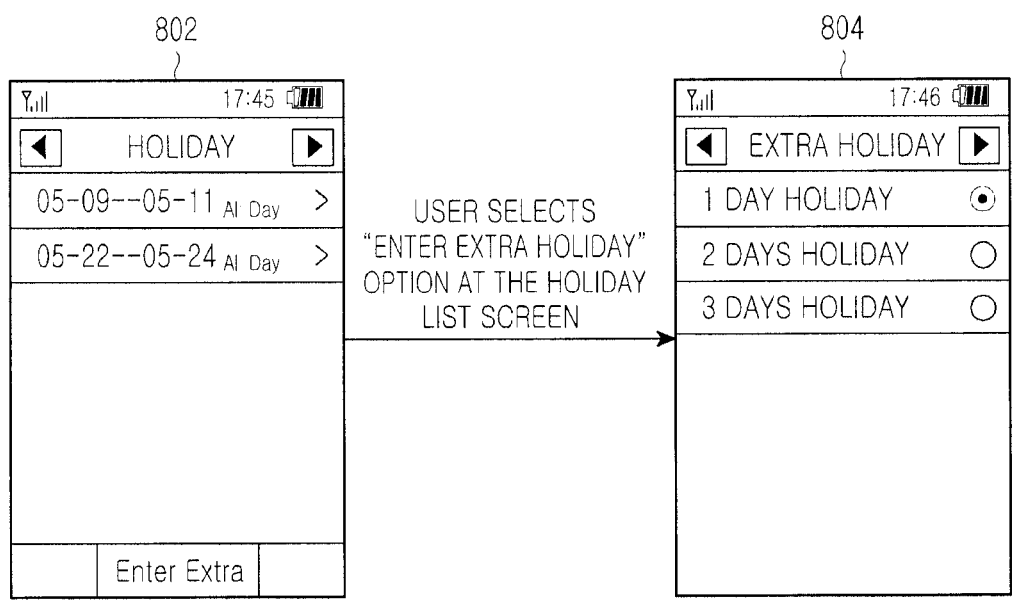
FIG. 8A and FIG. 8B illustrate an exemplary user interface for planning an event using calendar application in the electronic device, in accordance with another exemplary embodiment of the present invention.
Figure 8B:
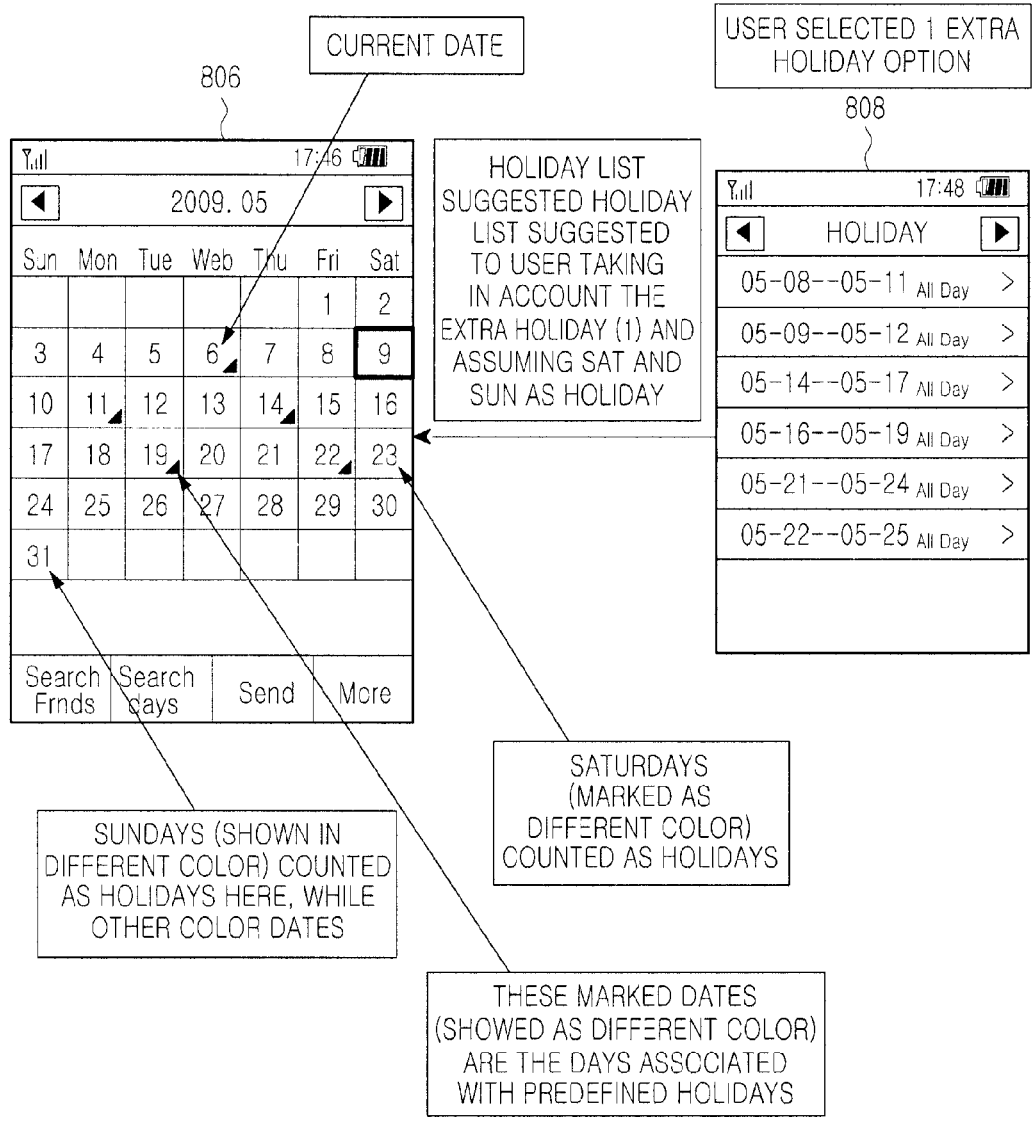

FIG. 8A and FIG. 8B illustrate an exemplary user interface for planning an event using calendar application in the electronic device, in accordance with another exemplary embodiment of the present invention. In this example, the "Enter Extra Holiday" option is selected by a user, and the holiday planner application further suggests the user to select continuous holidays (<=3) taking in account extra holidays (as entered by user) and also assuming Saturday and Sunday as holidays.

The user is provided the interface shown in FIG. 8A after selecting "Enter Extra Holiday" option. Then the holiday planner application suggests the user about the continuous holidays (<=3) taking in account extra holidays (as entered by user) assuming Saturday and Sunday as holidays. Initially, the user enters the holiday planner application. The user then views continuous holiday over the year by "View Holidays" option shown in section 802. Thereafter, the user can selects "Enter Extra Holiday" option to check for continuous holiday that the user can get by taking some extra holidays (CL, PL, and the like) as shown in section 804. For example, if the user plans to take one (1) extra holiday from his work place.

Thereafter, the holiday planner application will show user continuous holidays set of the full year taking in account extra holidays assuming Saturday and Sunday as holidays. The user can then select any holiday list set and go to the respective holiday set starting date in the calendar.

Figure 9:
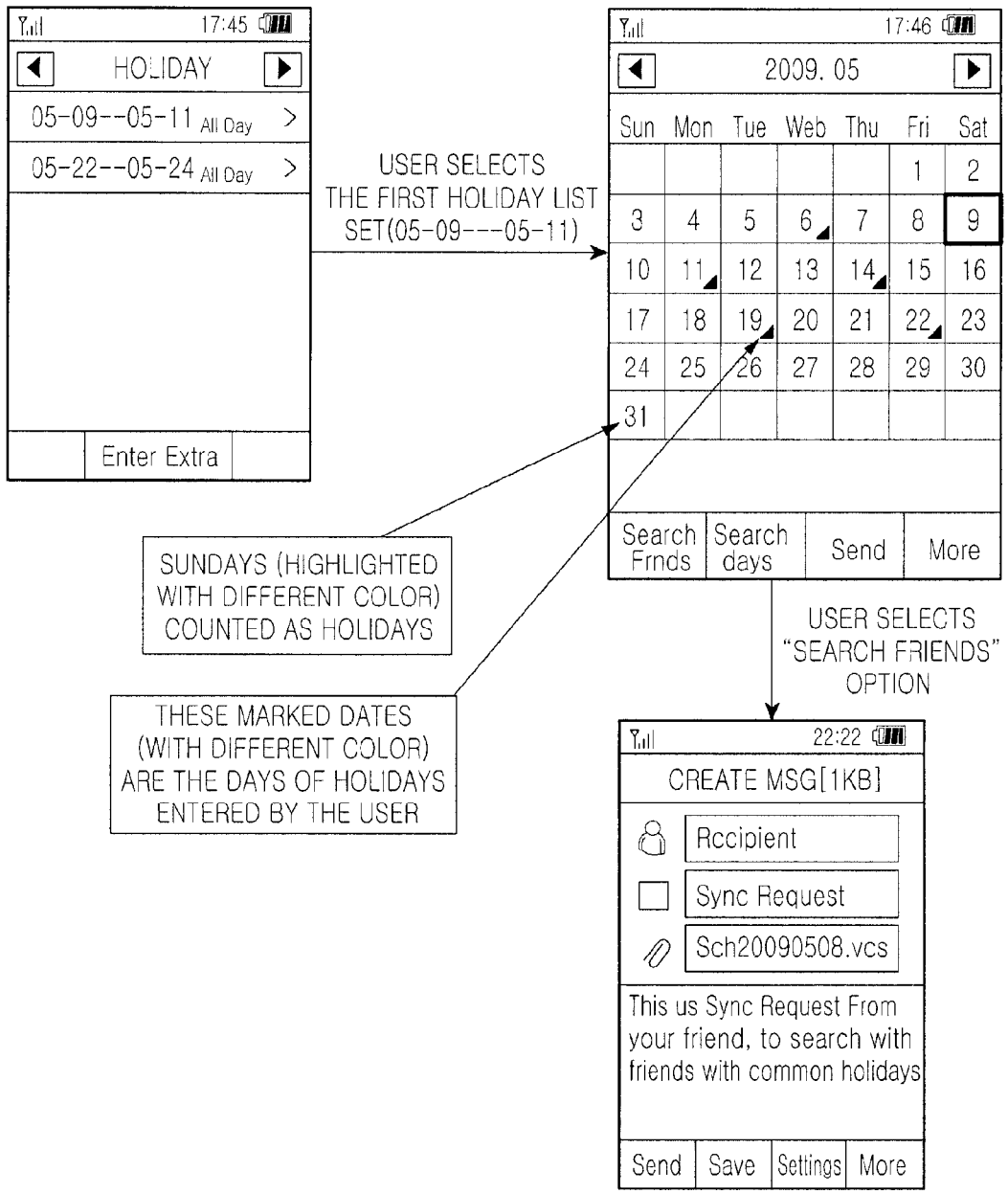
FIG. 9 illustrates an exemplary user interface for planning an event using calendar application in the electronic device, in accordance with an exemplary embodiments of the present invention.

FIG. 9 illustrates an exemplary user interface for planning an event using calendar application in the electronic device, in accordance with an exemplary embodiment of the present invention. FIG. 9 illustrates how the user can send the syncing request to desired contacts. In this example, the user sends the Sync request to different contacts using email.

A user (say Sam) has selected a holiday group (from May 9th to May 11th). Next, Sam wants to search for friends with same holidays in order to plan his holidays with them. Sam can then select "search friends", as he wants to search for the friends with the same holidays. Sam will then be taken to compose mail section of the mail account where there can be a predefined subject and text in the mail, with the attached Vcal (.vcs).

User Sam can then enter contacts addresses and/or phone numbers to whom he wants to send the sync request. Further, based on the subject and text field of the mail, the Holiday planner application of the selected contacts will recognize that it is the sync request from the user's holiday planner application and take the corresponding action. Further, the attached Vcal tags will provide the data for the syncing of the between holiday planner application of user and the selected contacts.

Figure 10:
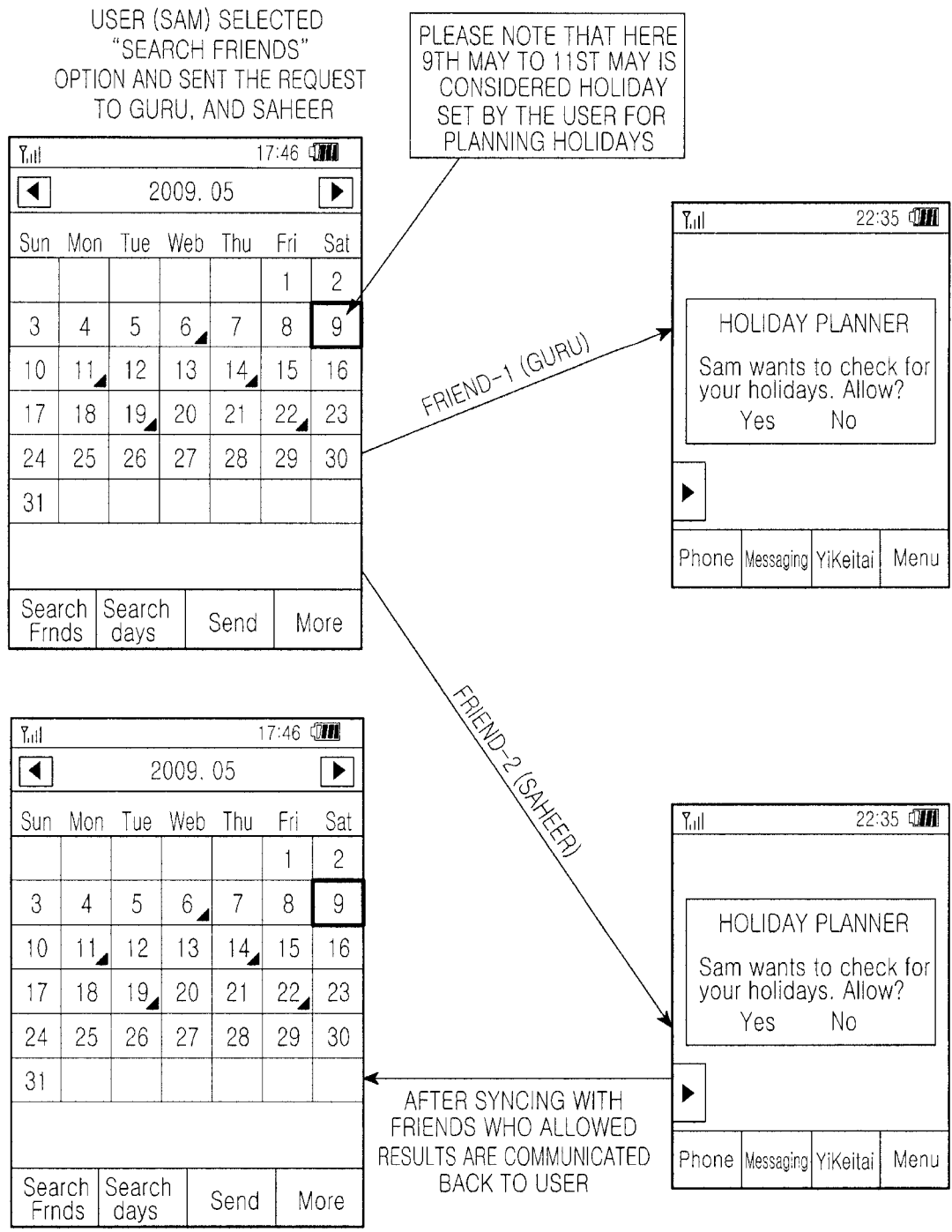
FIG. 10 illustrates an exemplary user interface for planning an event using calendar application in the electronic device, in accordance with yet another exemplary embodiment of the present invention.

FIG. 10 illustrates an exemplary user interface for planning an event using calendar application in the electronic device, in accordance with yet another exemplary embodiment of the present invention. The figure depicts an interface to search for friends with common holidays, request for sync received by the friends and results of the request being notified to the user. The figure mainly gives a visual interface for the usefulness and effectiveness of the application.

For example user "Sam" has selected a holiday group (May 9th to May 11th). Sam can then search for friends with same holidays in order to plan his holidays with them, so he selects "search friends" option. From his contact book Sam sent the request to two of his friends (Guru and Saheer). The holiday planner application will start to search in their holiday planner application for the same holiday set if the friends (Guru and Saheer) confirm to receive the request from Sam. The holiday planner application searches for the same holiday set as selected by Sam (May 9th to May 11th) in the selected contacts and notifies the result to Sam that "Guru and Saheer" (among selected contacts) have the same holiday as Sam does.

User Sam can now choose to sync with the notified contacts. Once Sam confirms the sync option, sync will be performed and user will remain in sync with his selected friends for that schedule (holiday set). Sam will then have several options such as "check for the best travel packages available" or "send SMS to friends about the schedule". As the dates are in sync, the Sam can also get or send immediate updates regarding if there are any change in the schedule.

Figure 11:
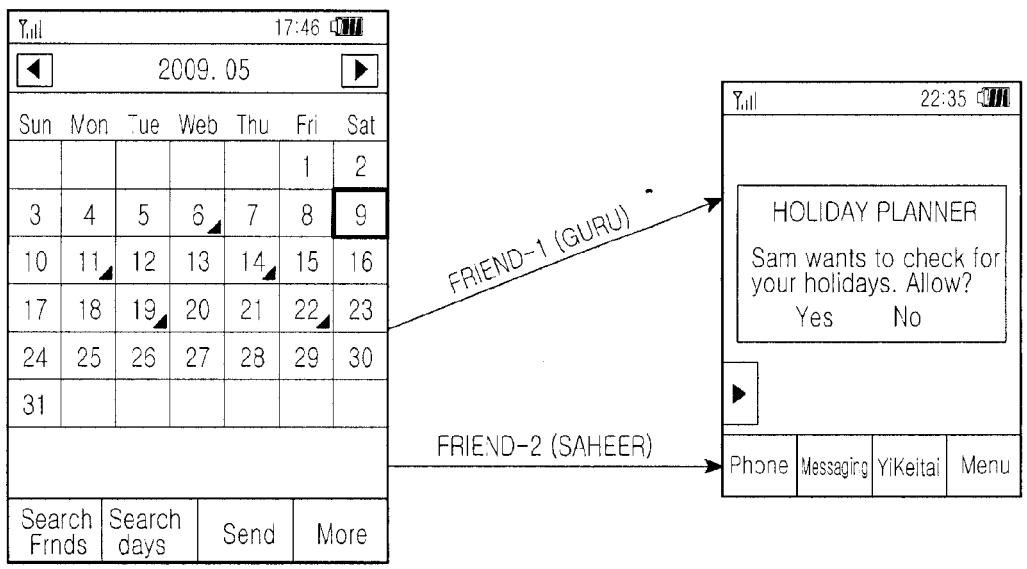
FIG. 11 illustrates an exemplary user interface for planning an event using calendar application in the electronic device, in accordance with still another exemplary embodiment of the present invention.
Figure 11:
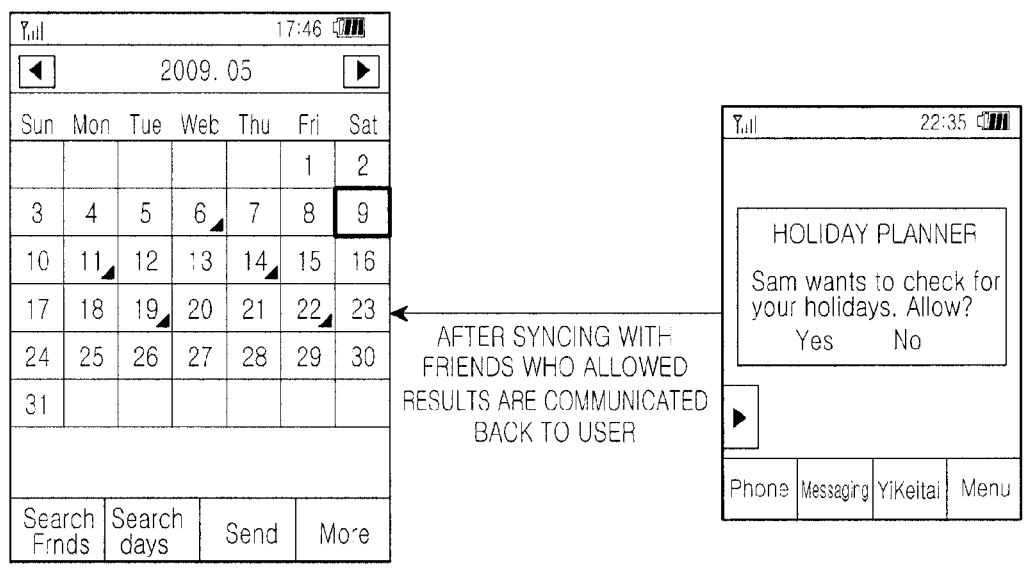

FIG. 11 illustrates an exemplary user interface for planning an event using calendar application in the electronic device, in accordance with still another exemplary embodiment of the present invention. FIG. 11 illustrates an interface through which a user searches for the same continuous holidays amongst friends, then request for the syncing of the holidays and notifying the user. FIG. 11 also shows an interface for identifying best possible date search technique for the user.

A user ("Sam") has selected a holiday group (May 9th to May 11th). Sam can then search for friends with same holidays in order to plan his holidays with them, so he selects the option "search days". Thereafter, from his contact book he can send a request to his friends, for example his friends "Guru", and "Saheer". Once his friends (Guru and Saheer) confirm receiving the request, the application will start to search in their holiday planner application and notifies the result to the user Sam.

The holiday planner application also takes into consideration all the possible holiday list sets of the user and try to find the same within selected contacts. The application identifies the dates 21st, 22nd and the 23rd of May, as the common dates between Sam, Guru and Saheer, and notifies Sam of the commonality of dates. Sam can also choose to sync with notified contacts. Once the user confirms the sync option, the sync will be performed and user will remain in sync with his selected friends for that schedule. The user can then have several options to perform. For example, the user can "Check for the Best travel packages available" or "send SMS to friends about the schedule" options. The user can also receive or send immediate updates regarding change in schedule if any in the user or any of the synced contacts for that holiday set as the user is being in sync.

Figure 12:
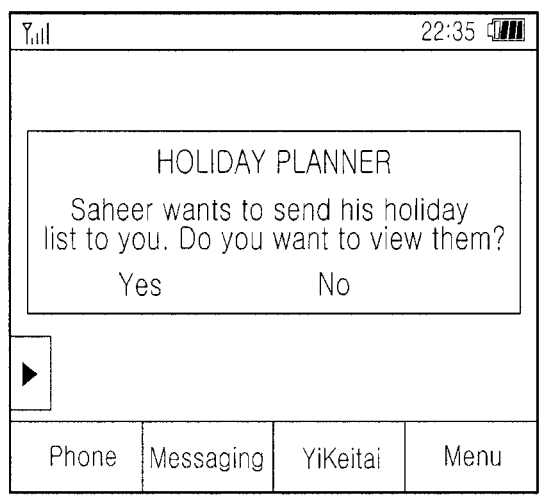
FIG. 12 illustrates an exemplary user interface for planning an event using calendar application in the electronic device, in accordance with yet another exemplary embodiment of the present invention.

FIG. 12 illustrates an exemplary user interface for planning an event using calendar application in the electronic device, in accordance with still another exemplary embodiment of the present invention. The figure shows a user interface on how a user of an electronic device having holiday planner application associated with the calendar application will receive a list holidays from different users. The user can also send a holiday list to different users, for example his/her friends.

The holiday list can be sent/received using various formed of wired and/or wireless communication including Short Message Service (SMS), Multimedia Message Service (MMS), Near Field Communication (NFC) techniques, Bluetooth, Infrared in V-calendar format, and the like, or IP just to name a few possibilities. Thereafter, each of the contacts will have an option to either accept or reject the holiday list sent by the user.

Figure 13:
FIG. 13 illustrates an exemplary user interface for planning an event using calendar application in the electronic device, in accordance with even another exemplary embodiment of the present invention.

FIG. 13 illustrates an exemplary user interface for planning an event using calendar application in the electronic device, in accordance with still another exemplary embodiment of the present invention. The figure explains how holiday planner application will intimate user about any event in case it occurs in the planned holiday schedule.

For example, if the user plans to take leave from March 14th to March 21st as shown in the calendar, then the application will notify the user of an already planned event that is within the range of dates. For example, the application will notify the user that Anniversary is already planned on 20th March, if 20th March is already set as the anniversary date in the calendar.

Various exemplary embodiments of the present invention as described above provide the following advantages. The present invention provides a method and apparatus for planning an event using a holiday planner application associated with a calendar application of an electronic device. The present invention plays an important role that combines calendar application and social networking in an easy and useful manner. The present invention provides the user with effective utilization of holidays. The present invention prevents missing of important continuous holidays. The present invention also shows a list of the friends having same continuous holidays that further helps in easier and effective planning of the event. Further the present invention shows a common (best) possible set of holidays among friends for easier and effective planning.

The present invention allows one or more users to sync their holidays. Hence any changes in a plan will immediately notify the one or more users with the changed plan. The present invention shows all month's continuous holidays at a time. Hence, the present invention reduces the manual effort of scanning the calendar again and again for planning an event. Furthermore, the present invention enables better planning of events based on the number of people available on a holiday.

As can be appreciated from the foregoing description, according to the present invention, it is possible to intuitively and efficiently plan an event by using calendar application in an electronic device.

In the preceding specification, the present disclosure and its advantages have been described with reference to specific exemplary embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

The above-described methods according to the present invention can be realized in hardware, as software, firmware or computer code that can be stored in a recording medium such as a CD ROM, an RAM, a floppy disk, a hard disk, or a magneto-optical disk or downloaded over a network, so that the methods described herein can be rendered in such software using a general purpose computer, microprocessor, or a special processor or in programmable or dedicated hardware, such as an ASIC or FPGA. As would be understood in the art, the computer, the processor or the programmable hardware include memory components including but in no way limited to, e.g., RAM, ROM, Flash, PROM, and EPROM, as well as any other memory chip or cartridge etc. that may store or receive software or computer code that when accessed and executed by the computer, processor or hardware implement the processing methods described herein.

Embodiments of the present disclosure may be related to the use of the computer system for implementing the techniques described herein. In one embodiment, the techniques are performed by the processor or microprocessor by using information included in the memory. Such information can be read into the main memory from another machine-readable medium, such as storage device. The information included in the memory causes the processor to perform the method described herein.

The term "machine-readable medium" as used herein refers to any medium that participates in providing data that causes a machine to operation in a specific fashion. In one embodiment which is implemented using the computer system, various machine-readable mediums are involved, for example, in providing information to the processor for execution. The machine-readable medium can be a storage media. Storage media includes both non-volatile media and volatile media. Non-volatile media includes, for example, optical or magnetic disks, such as server storage unit. Volatile media includes dynamic memory. All such media must be tangible to enable the information carried by the media to be detected by a physical mechanism that reads the information into a machine.

In some exemplary embodiments, the machine-readable medium can be a transmission media including coaxial cables, copper wire and fiber optics, including the wires that include bus. Transmission media can also take the form of acoustic or light waves, such as those generated during radiowave and infra-red data communications, however the carrier wave is not the crux of the invention, but instead a transmission means for the data to be loaded onto a machine readable medium. Examples of machine-readable medium may include, but are not limited to, or any other medium from which a computer can read, for example online software, download links, installation links, and online links.

What is claimed is:

1. A method for planning an event using a calendar application in an electronic device comprising:
receiving by an antenna means information associated with a duration of a particular event comprising one or more days of leave via electronic communication;
scanning by a processor the calendar application in storage to identify one or more sets of continuous holidays corresponding to the duration of the particular event;
identifying by the processor a number of days of leave associated with each of the one or more sets of continuous holidays to fulfill the duration of the particular event in addition to the continuous holidays;
creating a list of one or more proposed date ranges that correspond to the duration of the particular event, the one or more sets of continuous holidays and the number of days of leave; and
displaying by a display unit the list of one or more proposed date ranges and the number of days of leave associated with each of the one or more proposed date ranges, during which the particular event can be planned,
suggesting activities by the processor associated with the particular event along with the list of one or more proposed date ranges and the number of days of leave associated with each of the one or more proposed date ranges that are displayed by the display unit, and
sharing a list of one or more proposed date ranges and the number of days of leave associated with each of the one or more proposed date ranges by transmitting the list of proposed date ranges and the number of days of leave associated with each of the one or more proposed date ranges to selected other users of one or more electronic devices via a sync request sent to the one or more electronic devices including tags for synching the calendar application of the electronic device with the selected other users in which the electronic device and the one or more electronic devices remain in synch for at least the particular event.

2. The method of claim 1, wherein a list of predefined holidays in the calendar application is associated with at least one of national holidays, restricted holidays, holidays associated with an organization, personal floating holidays selected by the user and a list of holidays received from users of one or more electronic devices.

3. The method of claim 1, wherein scanning the calendar application to identify one or more sets of continuous holidays further includes identifying the range of dates having a maximum number of continuous holidays corresponding to the duration of the particular event.

4. The method of claim 1, further comprising:
identifying a range of dates that includes a minimum number of days from the number of days of leave associated with each of the one or more proposed date ranges; and
notifying the user that the date ranges that includes the minimum number of days of leave.

5. The method of claim 2, further comprising receiving a list of holidays from other users transmitted by the users of one or more electronic devices.

6. The method of claim 5, further comprising synchronizing the list of predefined holidays in the calendar application with the list of holidays received from the users of one or more electronic devices.

7. The method of claim 6, further comprising identifying by the processor common holidays that includes a list of holidays that are common in the list of predefined holidays, the list of received holidays, and the restricted holidays.

8. The method of claim 7, further comprising displaying a list of one or more common date ranges and the number of days of leave associated with each of the one or more common date ranges based on the common holidays.

9. The method of claim 7, wherein the suggesting activities associated with the particular event includes electronically transmitting to the one or more electronic devices a list of one or more common ranges of dates and the number of days of leave associated with each of the one or more common date ranges based on the common holidays.

10. The method of claim 1, further comprising identifying a predefined task corresponding with the list of one or more proposed date ranges and the number of days of leave associated with each of the one or more proposed date ranges, wherein the predefined task comprises a task that is set in the calendar application prior to planning of the event.

11. The method of claim 1, further comprising scheduling the particular event on event dates, wherein the event dates are selected from the list of one or more proposed date ranges and the number of days of leave associated with each of the one or more proposed date ranges.

12. The method of claim 11, further comprising outputting an alert in the electronic device associated with the event dates.

13. The method of claim 11, further comprising outputting an alert when a reminder is set in the event dates.

14. The method of claim 1, wherein the information associated with the duration of the event comprises at least one of a range of predefined dates including a start date and an end date, a number of days associated with the event, a predefined number of days that is taken as leave, one or more months during which the event is scheduled, or one or more years during which the event is scheduled.

15. The method of claim 1, wherein the continuous holidays are identified based on a list of predefined holidays that is associated with the calendar application and a list of restricted holidays, and the list of restricted holidays comprises at least one of a Saturday, Sunday, optional holidays and ad-hoc holidays.

16. An apparatus for planning an event using a calendar application in an electronic device comprising:
an input unit for entering information associated with a duration of the particular event comprising one or more days of leave;
antenna means for receiving information associated with the duration of the particular event;
a processor for scanning the calendar application from storage to identify one or more sets of continuous holidays corresponding to the duration of the particular event, for identifying a number of days of leave associated with each of the one or more set of continuous holidays to fulfill the duration of the event in addition to the continuous holidays, and for creating a list of one or more proposed date ranges that correspond to the duration of the particular event, the one or more sets of continuous holidays and the number of days of leave and the processor displaying suggested activities associated with the particular event along with the list of one or more proposed date ranges and the number of days of leave associated with each of the one or more proposed date ranges that are displayed by a display unit; and
the display unit for displaying the list of one or more proposed date ranges and the number of days of leave associated with each of the one or more proposed date ranges, during which the event can be planned, and
wherein said electronic device shares the list of one or more proposed date ranges and the number of days of leave associated with each of the one or more proposed date ranges by transmitting the list of proposed date ranges and the number of days of leave associated with each of the one or more proposed date ranges to other users of one or more electronic devices via a sync request sent to the one or more electronic devices including tags for synching the calendar application of the electronic device with the selected other users in which the electronic device and the one or more electronic devices remain in synch for at least the particular event.

17. The method according to claim 16, further comprising the electronic device receiving via the antenna means and storing a list of holidays of other users transmitted by the users of said one or more electronic devices.

18. The apparatus of claim 17, further comprising the processor synchronizing the list of predefined holidays in the calendar application with the list of holidays received from the users of said one or more electronic devices.

* * * * *